May 7, 1957 J. B. WHEATLEY ET AL 2,791,091
POWER PLANT COOLING AND THRUST BALANCING SYSTEMS
Filed May 15, 1950 2 Sheets-Sheet 1

Inventors.
John B. Wheatley,
Otakar P. Prachar,
Arthur W. Gaubatz &
Donald G. Zimmerman
By Willis, Helwig & Baillio
Attorneys

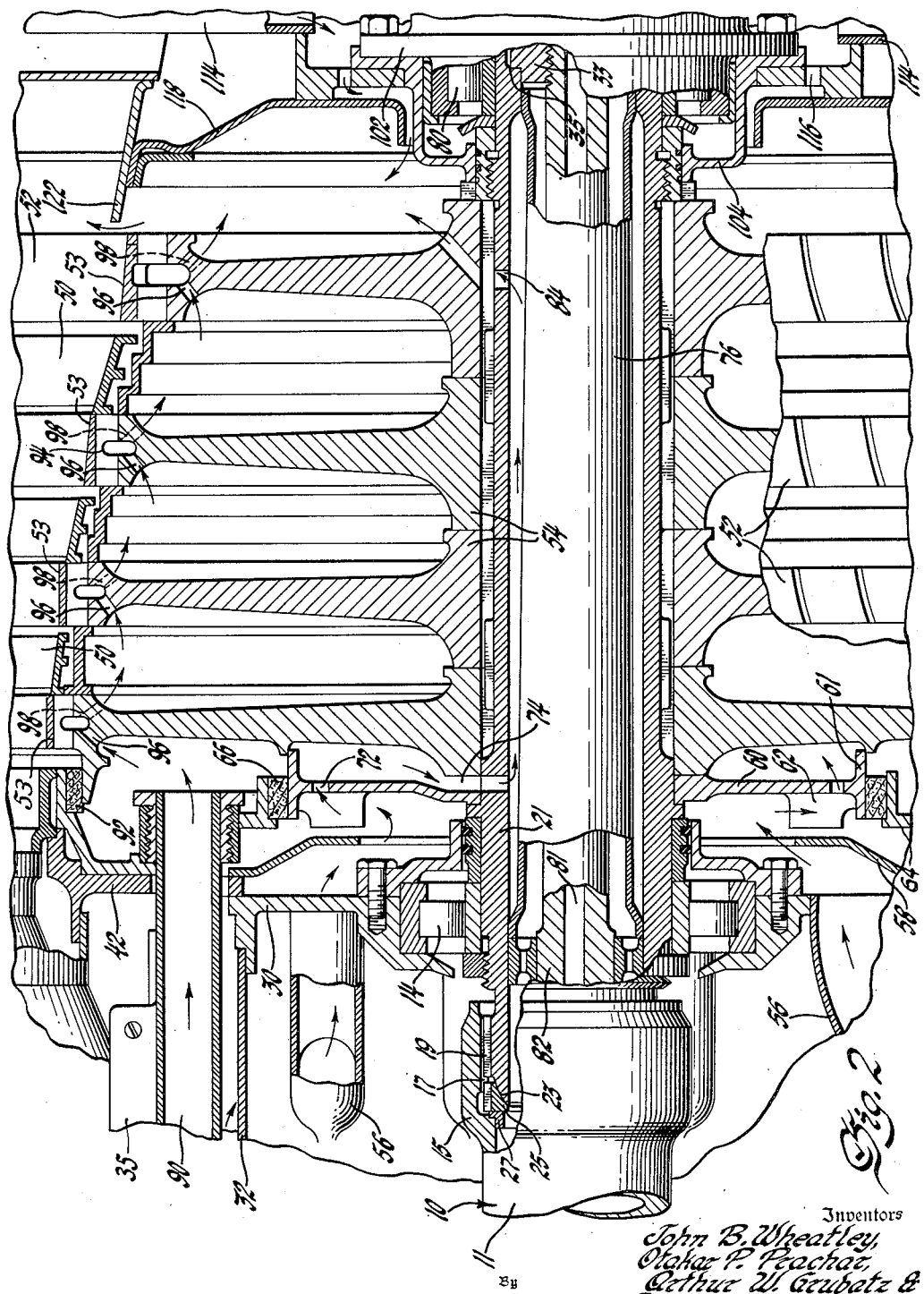

United States Patent Office 2,791,091
Patented May 7, 1957

2,791,091

POWER PLANT COOLING AND THRUST BALANCING SYSTEMS

John B. Wheatley, Otakar P. Prachar, Arthur W. Gaubatz, and Donald G. Zimmerman, Indianapolis, Ind., assignors to General Motors Corporation, Detroit, Mich., a corporation of Delaware Application May 15, 1950, Serial No. 162,068

12 Claims. (Cl. 60—39.66)

This invention relates to internal combustion engine power plants, and more particularly to a compressor turbine power unit having a combined cooling system and end thrust reducing system for the power plant.

The invention is illustrated in conjunction with an axial flow gas turbine power plant. The power plant has an axial flow compressor mounted on a shaft to supply air to a plurality of burners mounted about the shaft and connected to an axial flow turbine mounted on a main shaft. The resultant end thrust on the main shaft is reduced by an air passage which connects the end chamber of the axial flow compressor housing with the first chamber of the turbine housing. Air is bled from this first chamber of the turbine housing or balancing chamber through passages in the turbine discs adjacent the blades in order to cool the blades. The blade root cooling air from the balancing chamber after passing through cooling passages in each of the turbine wheels is drawn into the turbine exhaust passage. The blade root cooling air flows through the passages in the turbine wheels due to the fact that the pressure in the equalizer annulus or balancing chamber ahead of the first turbine wheel is higher than the pressure aft of the last turbine wheel. Other important portions of the power plant are cooled by the air which enters an annular space within a double wall portion of the power plant frame. The air is drawn through this space by a small centrifugal fan mounted adjacent the first turbine wheel. The centrifugal fan draws the air past the forward turbine bearing to cool it and expels a portion of the air around the burners and turbine shell to an atmospheric vent, and the remainder through an annular passage provided in the main shaft to cool the shaft, and out of the main shaft to the low pressure area in the exhaust passage. The rear turbine bearing is also cooled by air drawn from outside the power plant and led past the bearing to the low pressure area in the exhaust passage.

A primary object of this invention is to provide in a compressor turbine power plant a combined system for reducing the end thrust and cooling portions of the power plant.

Another object of the invention is to provide in a turbo power plant having a compressor and a turbine mounted coaxially on a shaft, an air passage connecting the compressor casing to the turbine casing to substantially balance the end thrust on the power plant shaft.

Another object of the invention is to provide a turbo power plant having a plurality of burners and a turbine mounted on a main shaft with a cooling air conduit between the burners and the shaft through which air flows to a fan mounted on the turbine shaft to provide an insulating wall between the shaft and the turbine housing and the burners.

Another object of the invention is to provide a turbo power plant having oil passages in the center of the hollow turbine shaft and a fan mounted on the turbine shaft to draw air into the turbine casing and blow it through a passage in the shaft to cool the oil.

Another object of the invention is to provide, in a compressor turbine power plant, a conduit to interconnect the compressor and turbine chambers to balance the end thrust on the main turbine-compressor shaft and a plurality of air cooling passages through said turbine wheels adjacent the periphery thereof to provide a cooling air passage through said turbine wheels to the turbine exhaust passage.

These and other objects of the invention will be more fully explained and described in the following specification and drawings.

Figure 2 is an enlarged sectional view of the turbine showing the cooling fan portion.

Figure 1:
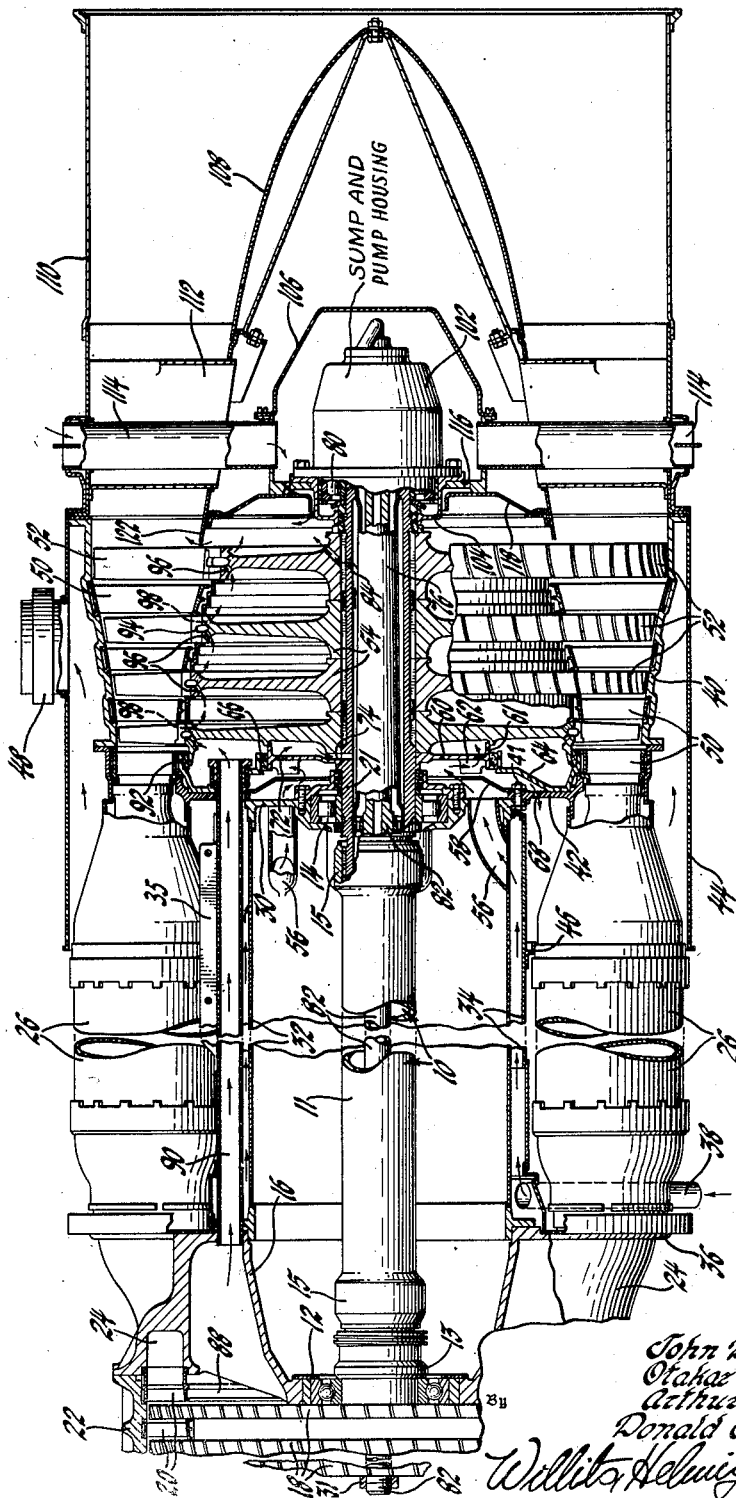
Figure 1 shows a partial longitudinal section of a turbo prop power plant with parts broken away to show detail features, the upper half being a vertical section to show the balancing tube and the lower half being a horizontal section to show the annular cooling passage.

The invention is illustrated as applied to an axial flow compressor turbine power plant. The drawing shows the rear portion of the power plant mounted about shaft 10 which is rotatably supported in the rear compressor bearing 12 and the forward turbine bearing 14. The compressor bearing 12 is mounted in the rear portion 16 of the compressor housing. Just forward of the rear compressor bearing 12 and housing section 16, the compressor wheels 18 are mounted on the shaft 10 for rotary movement between the stator blade rows 20 which are secured to the cylindrical compressor casing 22. The end portion of the compressor casing 16 has a plurality of passages 24 which connect the compressor outlet to the burners or combustion chambers 26. The burners are mounted around the shaft between the compressor and turbine.

The forward turbine bearing 14 is supported in an annular partition 30 forming the forward wall of the turbine casing. A cylindrical wall and frame member 32 extends from the rear portion 16 of the compressor casing to the turbine partition 30, and is secured to these elements to provide a rigid frame. A jacket member or wall 34 is concentrically positioned around and spaced from the frame 32 and sealed at both ends to the compressor frame 16 and the turbine partition 30 to provide an annular cooling pasage and heat shield around the shaft and within the burners 26. The rear portion 16 of the compressor housing has extensions 36 to support the burners. An air inlet entrance to the annular cooling air passage between the frame wall 32 and the jacket wall 34 is provided by a conduit 38 between the burners 26 just aft of the support 36. The conduit 38 extends radially between the burners and may be secured to the support 36 and is connected to an aperture in the forward portion of jacket 34.

The rear portion of the burners 26 and the forward portion of the turbine stator housing 40 are supported by an annular plate 42 which is suitably secured by bolts 41 shown in Fig. 1 to the peripheral edge of the annular partition 30 and completes the forward wall of the turbine housing. The rear end of the turbine stator housing 40 is enclosed by a cylindrical housing 44 which is secured to an annular support 46 which has apertures to receive the burners. A cooling air outlet 48 is provided in the cylindrical housing 44. A number of rows of stator blades 50 are secured to the inside of the stator housing 40. The rotor blade rows 52 having platforms 53 are mounted on turbine wheels 54 fixed to the shaft 10 for rotation between the stator blade rows 50.

Ducts 56 for the cooling air extend from the rear portion of the annular passage between the wall 32 and the jacket wall 34 and bring the cooling air into the space between the forward turbine partition 30 and the first turbine wheel 54. An annular baffle 58 secured at its outer rim to the support 42 directs the air inward adjacent the bearing 14 and the shaft 10. The air then moves outward adjacent the fan wheel 60 and is moved outward by the impeller blades 62. The fan wheel 60 and the first turbine wheel 54 have enlarged hubs to provide an annular space between the wheels. This annular space is sealed at its outer periphery by a rim 61 on the fan wheel which engages the disc portion of turbine wheel 54. A portion of the air then passes between the partition 58 and the fan housing member 64 which is secured to the outer portion of the support 42 and has a running seal 66 of the wiping type as shown or of the labyrinth type with the fan wheel 60. The support 42 has a series of openings 68 between the partition 58 and the fan frame member 64 to allow air to be blown by the fan out between the burners 26 and around the stator housing 40. This air travels within the cylindrical housing 44 to the vent 48 where it enters the atmosphere.

The remainder of the air driven by the fan passes through apertures 72 in the fan wheel adjacent the blades 62 and moves radially inward in the annular space between the fan wheel and the first turbine wheel 54 to a passage 74 through the hub of the turbine wheel and the shaft 10. A thin sleeve 76 mounted within the shaft 10 and engaging the inside of the shaft in sealing relation adjacent the bearing 14 and adjacent the rear turbine bearing 80 provides an annular passage within the shaft for the cooling air. This air between the sleeve 76 and shaft 10 cools the oil in the central oil conduit 81 in the hollow bolt 82 and the returning oil in the annular passage between the bolt 82 and the sleeve 76. Oil may be fed from passage 81 to bearing 80 and returned to the annular passage by means such as are disclosed in the co-pending application of Wheatley et al., Serial No. 159,792, filed May 3, 1950, now Patent No. 2,693,248 issued November 2, 1954. The details are not material to this invention. The air flows through this cooling passage in the shaft to the rear end of the turbine where it exits through an aperture 84 in both the shaft 10 and the hub of the last turbine wheel 54.

The rear portion 16 of the compressor casing has an annular space 88 facing the disc portion of the last compressor wheel. The space 88 is connected to a pair of equalizer pipes 90 which fit in apertures in the rear portion of casing 16. The rear end of each equalizer tube passes through the turbine partition 42 and the fan partition 64 to a space facing the annular surface of the first turbine wheel 54 outside of the fan wheel 60. A suitable running seal 92 of the wiping type as shown or of the labyrinth type seals the outer perimeter of this space and the running seal 66 between the fan wheel and the fan partition 64 seals the inner perimeter of this space. The equalizer pipes 90 extend through the space between the cylindrical wall or frame member 32 and the jacket member or wall 34 which is spaced from the frame 32. The outer wall 34 is formed by two generally semi-cylindrical parts which are joined along bolting flanges 35 adjacent the pipes 90.

Each of the turbine wheels 54 has an annular passage 94 at the base of the blades. The turbine wheel also has inlet passages 96 and outlet passages 98 which are circumferentially spaced from each other so that the cooling air after entering through an inlet passage 96 must travel circumferentially through the passage 94 to cool the blades before reaching an outlet passage 98. The air is bled from the equalizing chamber adjacent the first turbine wheel 54 through an annular cooling passage 94 in each of the turbine wheels and then enters the space between the last turbine wheel and the turbine housing.

The bearing 80 is supported in a sump and oil pump housing 102 which has an oil seal 104 at the forward end. The bearing and sump housing is surrounded by a cooling air chamber 106. The cooling air chamber 106 is located within the inner exhaust cone 108. The outer exhaust duct wall 110 is secured to the turbine stator 40. A plurality of struts 112 extend radially from the outer wall 110 to the inner wall of cone 108 of the exhaust passage and may be employed to support the inner cone. Cooling air inlet passages 114 may extend from the atmosphere through the hollow struts 112 to the cooling air chamber 106. From the chamber 106 the air passes out to an aperture 116 in the forward wall of the chamber and passes around the bearing 80 and the rear partition 118 of the turbine housing. There the cooling air from the rear bearing 80 joins with the cooling air from within the main shaft 10, and the cooling air from the passages 94 at the roots of the blades in the annular space between the last turbine wheel 54 and the partition 118. Because of the low pressure existing in the exhaust passage just after the last row of turbine blades, the cooling air will be drawn out between the last turbine wheel 54 and the forward edge 122 of the jet cone 108 into the turbine exhaust. The structure described in this paragraph is the subject matter of application Serial No. 142,425 of John B. Wheatley for Bearing Cooling Systems, filed February 4, 1950, now Patent No. 2,759,700, issued August 21, 1956.

The main shaft 10 which extends through the compressor and turbine unit and is supported by the bearings 12, 14 and 80 is a composite structure consisting of a multipart tubular shaft 10 and a central tie bolt 82 holding the shaft together. The shaft 10 is made in three portions or sections, the forward or compressor portion 13, the connecting or central portion 11 and the rear or turbine portion 21. The central portion 11 of the tubular shaft 10 has an integral bell mouth flange 15 at each end to provide a flexible connection with the other shaft portions. As best shown in Figure 2 at the right end of shaft portion 11, the flange 15 is provided with internal splines 17 which engage with splines 19 on the forward end of the turbine shaft portion 21. The forward end of tubular shaft portion 21 has an annular spherical bearing portion 23 which engages a spherical seat 25. Suitable splines are formed on the outer perimeter of the seat 25 to engage splines 17 to prevent rotation of the seat relative to the connecting shaft 11. The seat 25 also bears against a shoulder member 27 to limit the axial movement of the seat 25 relative to the connecting shaft 11. At the forward end adjacent the compressor, the shaft portion 11 has a similar splined and spherical seat connection (not shown) to the shaft portion 13. The shaft portion 13 may be another hollow shaft portion with compressor wheels mounted in the same way as the turbine wheels are mounted in Figure 2 or the shaft portion 13 may be a portion of the last compressor wheel 18 as shown in the copending application Serial Number 161,326, filed May 11, 1950, McDowall et al., Turbine or Compressor Rotor, now Patent No. 2,675,174, issued April 13, 1954. When either structure is used a nut 31 threaded on bolt 82 engages the forward end of a hollow compressor structure or shaft 13 at the forward end of the compressor. The bolt 82 may be of one piece construction but may be made of two pieces which would be anchored to a coupling member secured in shaft 13 near bearing 12.

At the rear end of shaft portion 21, a nut 33 is threaded on the end of bolt 82 and engages a shoulder 35. Thus the bolt 82 acts as a tension member to hold and preload or compress the compressor shaft assembly 13, the central shaft portion 11 and the turbine shaft 21 together against the stop nut 31.

The endwise movement of the turbine rotor is reduced to a minimum due to both the balancing of the gas forces on the compressor and turbine rotors and the preloading of the shaft 10 and the bolt 82. The resulting axial load on the shaft 10 produced by the gas forces on the compressor and turbine rotors is taken by the bearing 12. Since these forces are balanced under normal operating conditions the resulting end load on the compressor bearing 12 is small. The shaft portions 11, 13 and 21 are preloaded by tightening the nut 33 on one end of bolt 82 in housing 102 while the nut 31 at the other end provides an abutment. This preload holds the turbine shaft 21 and connecting shaft 11 in compression until the turbine rotor end thrust to the right becomes equal to the preload. Thus the turbine rotor cannot be displaced to the right until the thrust on the turbine rotor exceeds the preload on the bolt. This reduces the lateral displacement of the turbine rotor. In addition the semi-spherical thrust blocks at each end of the central or connecting shaft 11 and the engaging spherical surfaces on the compressor shaft 13 and the turbine shaft 21 compensate for any minor misalignment of the compressor and turbine shafts.

This shaft arrangement forms the subject matter of our divisional application for Gas Turbine Shaft, Serial No. 593,428, filed June 25, 1956.

When the turbine is operating, the air enters the forward end of the compressor where it is compressed and forced at high velocity and pressure into the burners 26. There the air is mixed with fuel and burned. The hot gases then pass through the turbine to generate power to drive the compressor, and out through the exhaust passage. The rear portion 88 of the compressor housing is not tightly sealed from the annular compressor flow passage in alignment with the blades and thus air flows under pressure from the compressor into housing portion 88 and into conduit 90, which is connected to the forward portion of the turbine housing in order to equalize the axial pressures on the main shaft. The equalizer annulus or balancing chamber at the forward end of the turbine is also connected to a series of passages 94 through the turbine wheels adjacent the roots of the blades. The entrance passages 96 and exit passages 98 are circumferentially displaced so that the air moves circumferentially to cool the blade roots. This equalizing and cooling air which is under pressure in the balancing chamber ahead of the first turbine wheel enters the turbine wheel passages 96, 94 and 98 and leaves the last turbine wheel to pass into the lower pressure space between the wheel and the aft turbine partition where it is drawn into the turbine exhaust passage. The turbine frame is kept cool by providing a double wall structure within the burners 26 and surrounding the main shaft and bearing assembly. The double wall passage is provided by the frame wall 32 and surrounding jacket wall 34. Thus air enters through radial inlet pipes 38 to this annular passage and leaves through the ducts 56 to be impelled by the fan blades 62 mounted adjacent the first turbine wheel. The air is there divided with a portion passing through the apertures 68 and around the outlet nozzles of burners 26. Then this portion of the air travels axially between the cylindrical housing 44 and the stator housing 40 to the vent 48. The other portion of the air flows through the apertures 72 in fan wheel 60 and radially inward through the aperture 74 to the interior of shaft 10. Within the shaft 10 the air passes between the inner surface of the shaft 10 and a sleeve 76 to cool the oil within the sleeve. At the rear of the shaft 10 adjacent the bearing 80 the air passes out through an aperture 84 in the shaft 10 and the rear turbine wheel to the space between the turbine wheel and the rear partition 118 of the turbine.

The rear bearing is cooled by atmospheric air entering through the passage 114 to the chamber 106 which surrounds the bearing 80 and sump 102. The air leaves the chamber through apertures 116 at the forward end and passes around the forward surface of bearing 80 into the space between the last turbine wheel and the end partition 118. The air from the cooling passages 94 in the turbine wheels, the passages 84 in the shaft, and the passages 116 in the cooling chamber join in the space between the last wheel 54 and the end partition 118 and are drawn out between the wheel and the edge 122 of the fairing cone 108 into the low pressure area in the turbine exhaust passage. This low pressure area need be sub-atmospheric only to draw air from the atmosphere past the rear bearing since the other cooling air currents are moved by pressures above atmospheric.

The above described specific embodiment of the invention is illustrative and is subject to many modifications within the scope of the appended claims.

We claim:

1. In a gas turbine power plant, a shaft, a compressor having a housing and a turbine having a housing mounted on the shaft, a burner connected to the compressor outlet and the turbine inlet, a double walled frame member between said burners and shaft having an inlet adjacent the compressor and an exit adjacent said turbine, a fan connected to said exit, one outlet from said fan comprising a passage through said shaft to cool the shaft, and another outlet comprising a passage around said burners and around said turbine housing to cool the turbine.

2. In a gas turbine power plant, a shaft, a compressor having a housing and a turbine having a housing mounted on the shaft, a burner connected to the compressor outlet and the turbine inlet, a double walled frame member between said burners and shaft having an inlet adjacent the compressor and an exit adjacent said turbine, a fan connected to said exit, and outlet means from said fan to supply cooling air to cool the turbine.

3. In a power plant, a frame, a shaft rotatably supported on said frame, a compressor having a housing and a turbine having a housing mounted on said shaft, burners connected between the compressor outlet and the turbine inlet, said frame having a double walled portion between said burners and said shaft with an inlet adjacent the compressor and an outlet adjacent said turbine, and a fan connected to said outlet from the double walled portion impelling air through a passage in the shaft to cool the shaft.

4. In a power plant, a frame, a shaft rotatably mounted on said frame, a compressor having a housing and a turbine having a housing mounted on said shaft, burners connected between the compressor outlet and the turbine inlet, said frame having a double walled portion concentrically between said burners and said shaft with an inlet adjacent the compressor and an outlet adjacent said turbine, and a fan connected to said outlet from the double walled frame impelling air over the burners and around the turbine housing to cool the burners and turbine.

5. In a power plant, a frame, a shaft rotatably mounted on said frame, a compressor having a housing and a turbine having a housing mounted on said shaft, burners connected between the compressor outlet and the turbine inlet, said frame having a tubular double walled portion coaxial with said shaft between said burners and said shaft with an inlet adjacent the compressor and an outlet adjacent said turbine, and a fan connected to said outlet from the double walled frame impelling air through a passage in the shaft to cool the shaft and over the burners and around the turbine housing to cool the burners and turbine.

6. In a power plant, a frame having bearings, a main shaft mounted in said bearings on said frame, a lubricating oil passage in said shaft for supplying oil to one of said bearings, a compressor connected to said frame having a housing mounted on said shaft at one end of said frame, a turbine connected to said frame having a housing and wheels mounted on said shaft at the other end of said frame, an annular partition fixed to the forward end of the turbine housing dividing the space between the housing and wheel into two annular compartments, an equalizer tube connecting the rear end of the compressor housing and the outer annular compartment at the forward end of the turbine housing, a cooling air bleed passage from the forward end of the turbine housing transversely through the root section of the turbine wheels, said frame having a passage for cooling air, an air entrance to said passage adjacent said compressor, a fan mounted in the inner annular compartment of said turbine housing adjacent the forward end, an air outlet from said passage to said fan, a fan outlet extending through said shaft to cool the turbine lubricating oil in said lubricating oil passage in said shaft and another fan outlet from the turbine housing, a casing surrounding said housing and guiding the cooling air from the fan along said turbine housing, and an outlet from said casing.

7. In a power plant, a frame having bearings, a main shaft mounted in said bearings on said frame, a lubricating oil passage in said shaft for supplying oil to one of said bearings, a compressor connected to said frame having a housing mounted on said shaft at one end of said frame, a turbine connected to said frame having a housing and wheels mounted on said shaft at the other end of said frame, an equalizer tube connecting the rear end of the compressor housing and the forward end of the turbine housing, a cooling air bleed passage from the forward end of the turbine housing through the root section of the turbine wheels, said frame having an annular passage for cooling air surrounding said shaft, an air entrance to said passage adjacent said compressor, a fan mounted in said turbine housing adjacent the forward end, an air outlet from said passage to said fan, a fan outlet extending through said shaft to cool the turbine lubricating oil in said lubricating oil passage in said shaft and another fan outlet from the turbine housing, a cylindrical casing surrounding said housing and guiding the cooling air from the fan along said turbine housing, and an outlet from said cylindrical casing.

8. In a power plant, a frame having bearings, a main shaft mounted in said bearings on said frame, a lubricating oil passage in said shaft for supplying oil to one of said bearings, a compressor connected to said frame having a housing mounted on said shaft at one end of said frame, a space between the last wheel of the compressor and the casing to provide a bleed, a turbine connected to said frame having a housing and wheels mounted on said shaft at the other end of said frame, a seal between the first turbine wheel and the turbine housing to prevent bleeding, an equalizer tube connecting the rear end of the compressor housing and the forward end of the turbine housing, to equalize the pressure on the last compressor wheel and the first turbine wheel, a cooling air bleed passage from the forward end of the turbine housing through the root section of the turbine wheels, said frame having an annular passage for cooling air, an air entrance to said passage adjacent said compressor, a fan mounted in said turbine housing adjacent the forward end, an air outlet from said passage to said fan, a fan outlet extending through said shaft to cool the turbine lubricating oil in said lubricating oil passage in said shaft and another fan outlet from the turbine housing, a cylindrical casing surrounding said housing and guiding the cooling air along said turbine housing, and an outlet from said cylindrical casing.

9. A gas turbine engine comprising, in combination, a compressor, a turbine coaxial therewith, a shaft connecting the turbine and compressor, a shaft housing enclosing the shaft extending from the turbine to the compressor, a number of combustion chambers connecting the compressor and turbine and spaced circumferentially around the shaft housing, a case enclosing the turbine and the part of the combustion chamber adjacent the turbine, the shaft housing having spaced walls defining between them a cooling air duct, means defining an entry for cooling air into the duct adjacent the compressor, a fan on the shaft adjacent the turbine, means defining an outlet from the duct into the fan, means defining a flow path from the fan into the said case, and means defining an outlet from the said case for the cooling air.

10. A gas turbine engine comprising, in combination, a compressor, a turbine coaxial therewith, a shaft connecting the turbine and compressor, a shaft housing enclosing the shaft extending from the turbine to the compressor, a number of combustion chambers connecting the compressor and turbine and spaced circumferentially around the shaft housing, a case enclosing the turbine and the part of the combustion chamber adjacent the turbine, the shaft housing having spaced walls defining between them a cooling air duct, means defining an entry between the combustion chambers for cooling air into the duct adjacent the compressor, a fan on the shaft adjacent the turbine, means defining an outlet from the duct into the fan, means defining a flow path from the fan into the said case between the shaft housing and the combustion chambers, and means defining an outlet from the said case for the cooling air located radially outwardly of the combustion chambers.

11. A gas turbine engine comprising a compressor, a combustion apparatus supplied thereby, a turbine supplied by the combustion apparatus, a shaft drivingly connecting the compressor to the turbine, an annular exhaust duct connected to the turbine; the compressor, combustion apparatus, turbine, and exhaust duct defining a motive fluid path through the engine, the turbine comprising a stator and a rotor having a plurality of stages, means including the first stage of the turbine rotor defining a cooling air chamber, a conduit connecting the chamber to the outlet of the compressor to supply cooling air to the chamber, a seal between the chamber and the motive fluid path at the turbine inlet, the turbine rotor defining passages from the said chamber through the successive stages thereof adjacent the periphery of the rotor discharging downstream of the last stage of the rotor, the rotor being spaced from the inner wall of the exhaust duct to provide an outlet into the motive fluid path for the cooling fluid.

12. A gas turbine engine comprising a compressor, a combustion apparatus supplied thereby, a turbine supplied by the combustion apparatus, a shaft drivingly connecting the compressor to the turbine, an annular exhaust duct connected to the turbine; the compressor, combustion apparatus, turbine, and exhaust duct defining a motive fluid path through the engine, the turbine comprising a stator and a rotor having a plurality of wheels, means including the first stage of the turbine rotor defining a cooling air chamber, a conduit connecting the chamber to the outlet of the compressor to supply cooling air to the chamber, a seal between the chamber and the motive fluid path at the turbine inlet, the turbine rotor defining serially connected passages from the said chamber through the successive wheels thereof adjacent the periphery of the rotor discharging downstream of the last stage of the rotor, the rotor being spaced from the inner wall of the exhaust duct to provide an outlet into the motive fluid path for the cooling fluid.

References Cited in the file of this patent

UNITED STATES PATENTS

| | | |
|---|---|---|
| 2,149,194 | Stopp | Feb. 28, 1939 |
| 2,213,940 | Jendrassik | Sept. 3, 1940 |
| 2,401,826 | Halford | June 11, 1946 |
| 2,402,377 | Davenport | June 18, 1946 |
| 2,440,890 | Birmann | May 4, 1948 |
| 2,445,837 | McKenzie | July 27, 1948 |
| 2,471,892 | Price | May 31, 1949 |
| 2,473,417 | Essl | June 14, 1949 |
| 2,483,616 | Bergstedt | Oct. 4, 1949 |
| 2,487,514 | Boestad et al. | Nov. 8, 1949 |
| 2,488,783 | Stalker | Nov. 22, 1949 |
| 2,548,886 | Howard | Apr. 17, 1951 |
| 2,550,580 | McLeod | Apr. 24, 1951 |
| 2,578,481 | Lombard | Dec. 11, 1951 |
| 2,584,899 | McLeod | Feb. 5, 1952 |
| 2,588,532 | Johnson | Mar. 11, 1952 |

(Other references on following page)

UNITED STATES PATENTS

| 2,620,123 | Parducci | Dec. 2, 1952 |
| --- | --- | --- |
| 2,692,724 | McLeod | Oct. 26, 1954 |
| 2,722,101 | Wosika | Nov. 1, 1955 |

FOREIGN PATENTS

| 612,097 | Great Britain | Nov. 8, 1948 |
| --- | --- | --- |
| 345,984 | France | Nov. 8, 1904 |
| 963,245 | France | Dec. 26, 1949 |

(Corresponding to U. S. No. 2,647,684, August 4, 1953.)

OTHER REFERENCES

Flight, April 11, 1946, article entitled "Power Units for Future Aircraft," pages 371–374.